United States Patent
Shishido et al.

(10) Patent No.: US 11,983,452 B2
(45) Date of Patent: May 14, 2024

(54) INFORMATION PROCESSING APPARATUS, CONTROL METHOD, INFORMATION PROCESSING SYSTEM AND SERVER

(71) Applicant: CANON KABUSHIKI KAISHA, Tokyo (JP)

(72) Inventors: Kazunari Shishido, Kanagawa (JP); Hayato Shirai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 483 days.

(21) Appl. No.: 17/209,558

(22) Filed: Mar. 23, 2021

(65) Prior Publication Data
US 2021/0304337 A1   Sep. 30, 2021

(30) Foreign Application Priority Data
Mar. 30, 2020   (JP) ................ 2020-061431

(51) Int. Cl.
*G06F 3/12* (2006.01)
(52) U.S. Cl.
CPC .......... *G06F 3/1239* (2013.01); *G06F 3/1222* (2013.01); *G06F 3/1287* (2013.01)
(58) Field of Classification Search
CPC .... G06F 3/1239; G06F 3/1222; G06F 3/1287; G06F 3/1219; G06F 3/1203; G06F 3/1285; G06Q 50/18
See application file for complete search history.

(56) References Cited

U.S. PATENT DOCUMENTS

2013/0100187 A1*  4/2013  Yasuzaki ............ B41J 2/16517
                                                           347/9
2014/0244459 A1*  8/2014  Webb ..................... G06Q 30/04
                                                          705/34

(Continued)

FOREIGN PATENT DOCUMENTS

| JP | 2004-090517 A | 3/2004 |
| JP | 2011-048433 A | 3/2011 |
| JP | 2013-025375 A | 2/2013 |

(Continued)

OTHER PUBLICATIONS

Notice of Reasons for Refusal issued by the Japanese Patent Office dated Dec. 5, 2023 in corresponding JP Patent Application No. 2020-061431, with English translation.

(Continued)

*Primary Examiner* — A. Hunter Wilder
(74) *Attorney, Agent, or Firm* — Carter, DeLuca & Farrell LLP

(57) ABSTRACT

The present invention provides an information processing apparatus capable of performing appropriate processing under a predetermined usage agreement. To this end, the information processing apparatus receives information on an agreement period of a predetermined agreement from a server. Then, the information processing apparatus sets itself to a first state or a second state based on a current time and date and the agreement period received from the server, the first state being a state in which a predetermined service based on the predetermined agreement is unavailable, the second state being a state in which the service is available.

15 Claims, 11 Drawing Sheets

(56) References Cited

U.S. PATENT DOCUMENTS

2018/0131831 A1* 5/2018 Tolia .................... G06F 3/1229
2019/0065706 A1* 2/2019 Nishikawa ............ G06F 21/608

FOREIGN PATENT DOCUMENTS

| JP | 2015-044379 A | 3/2015 |
| JP | 2016-193592 A | 11/2016 |
| JP | 2017-047590 A | 3/2017 |
| JP | 2018-092548 A | 6/2018 |

OTHER PUBLICATIONS

Notice of Reasons for Refusal issued by the Japanese Patent Office on Mar. 12, 2024 in corresponding JP Patent Application No. 2020-061431, with English translation.

* cited by examiner

| TANK TYPE \ AGREEMENT STATE | FIRST STATE | SECOND STATE |
|---|---|---|
| GENERAL TANK | USABLE | USABLE |
| SERVICE TARGET TANK | UNUSABLE | USABLE |

FIG.7A

| TANK TYPE \ AGREEMENT STATE | FIRST STATE | SECOND STATE |
|---|---|---|
| GENERAL TANK | USABLE | UNUSABLE |
| SERVICE TARGET TANK | UNUSABLE | USABLE |

FIG.7B

| ITEM | DISPLAY |
|---|---|
| SERVICE TARGET TANK | USABLE/UNUSABLE |
| SERVER COMMUNICATION | —/CURRENTLY EXECUTED/ERROR ("ERROR NUMBER") |
| NUMBER OF SHEETS PRINTED IN MONOCHROME IN THIS MONTH | —/(NUMBER OF SHEETS PRINTED IN THIS MONTH) |
| NUMBER OF SHEETS PRINTED IN COLOR IN THIS MONTH | —/(NUMBER OF SHEETS PRINTED IN THIS MONTH) |

FIG.11A

| ERROR NUMBER | ERROR CONTENTS |
|---|---|
| 1 | AGREEMENT CONTROL SERVER DEVICE IS UNREGISTERED |
| 2 | CHARGING SERVER DEVICE IS UNREGISTERED |
| 3 | COMMUNICATION WITH AGREEMENT CONTROL SERVER HAS FAILED |
| 4 | COMMUNICATION WITH CHARGING SERVER HAS FAILED |
| 5 | AGREEMENT CONTROL SERVER DEVICE IS UNREGISTERED AND CHARGING SERVER DEVICE IS UNREGISTERED |
| 6 | AGREEMENT CONTROL SERVER DEVICE IS UNREGISTERED AND COMMUNICATION WITH CHARGING SERVER HAS FAILED |
| 7 | CHARGING SERVER DEVICE IS UNREGISTERED AND COMMUNICATION WITH AGREEMENT CONTROL SERVER HAS FAILED |
| 8 | COMMUNICATION WITH AGREEMENT CONTROL SERVER HAS FAILED AND COMMUNICATION WITH CHARGING SERVER HAS FAILED |

FIG.11B

INFORMATION PROCESSING APPARATUS, CONTROL METHOD, INFORMATION PROCESSING SYSTEM AND SERVER

BACKGROUND OF THE INVENTION

Field of the Invention

The present invention relates to an information processing apparatus that allows reception of a service based on an agreement, a control method of the same, an information processing system, and a server.

Description of the Related Art

There is known a method of managing a usage agreement of an information processing apparatus with a management server capable of communicating with the information processing apparatus. Japanese Patent Laid-Open No. 2017-047590 discloses a method in which a user accesses an information management server via a personal computer (PC) to conclude or cancel an agreement in an image printing apparatus.

SUMMARY OF THE INVENTION

In the configuration of Japanese Patent Laid-Open No. 2017-047590, the user can perform setting to conclude or cancel the agreement at the current moment but cannot arbitrarily set or change a start date or an end date of the agreement to a future date. Meanwhile, the information processing apparatus sometimes cannot normally communicate with the server at a timing at which the user desires to conclude the agreement, due to circumstances in the server or a network. Accordingly, in the conventional configuration, the user cannot appropriately set a desired agreement period and receive an appropriate service in the desired period in some cases.

The present invention has been made to solve the aforementioned problem. Accordingly, an object of the present invention is to provide a technique that allows the user to receive an appropriate service in a desired period.

In a first aspect of the present invention, there is provided an information processing apparatus capable of communicating with a server, comprising: a receiving unit that receives information on an agreement period of a predetermined agreement from the server; and a setting unit that sets the information processing apparatus to a first state or a second state based on a current time and date and an agreement start date indicated by the information on the agreement period, the first state being a state in which a predetermined service based on the predetermined agreement is unavailable, the second state being a state in which the predetermined service is available.

In a second aspect of the present invention, there is provided a control method of an information processing apparatus capable of communicating with a server, comprising: receiving information on an agreement period of a predetermined agreement from the server; and setting the information processing apparatus to a first state or a second state based on a current time and date and an agreement start date indicated by the information on the agreement period, the first state being a state in which a predetermined service based on the predetermined agreement is unavailable, the second state being a state in which the predetermined service is available.

In a third aspect of the present invention, there is provided an information processing system including a server and an information processing apparatus capable of communicating with the server, the information processing apparatus comprising: a receiving unit that receives information on an agreement period of a predetermined agreement from the server; and a setting unit that sets the information processing apparatus to a first state or a second state based on a current time and date and an agreement start date indicated by the information on the agreement period, the first state being a state in which a predetermined service based on the predetermined agreement is unavailable, the second state being a state in which the predetermined service is available.

In a forth aspect of the present invention, there is provided a server capable of communicating with an information processing apparatus that sets itself to a first state or a second state based on a current time and date and an agreement start date of a predetermined agreement, the first state being a state in which a predetermined service based on the predetermined agreement is unavailable, the second state being a state in which the predetermined service is available, the server comprising: an unit configured to save information on an agreement period of the predetermined agreement including the agreement start date, and a sending unit configured to send the information processing apparatus the information on the agreement period in response to a request from the information processing apparatus.

Further features of the present invention will become apparent from the following description of exemplary embodiments with reference to the attached drawings.

BRIEF DESCRIPTION OF THE DRAWINGS

FIGS. 7A and 7B are diagrams illustrating a usable/unusable state depending on an agreement state and the type of the main tank;

FIGS. 11A and 11B are diagrams illustrating display contents in a display screen.

DESCRIPTION OF THE EMBODIMENTS

<Schematic Configuration of Printing Apparatus>

Figure 1:
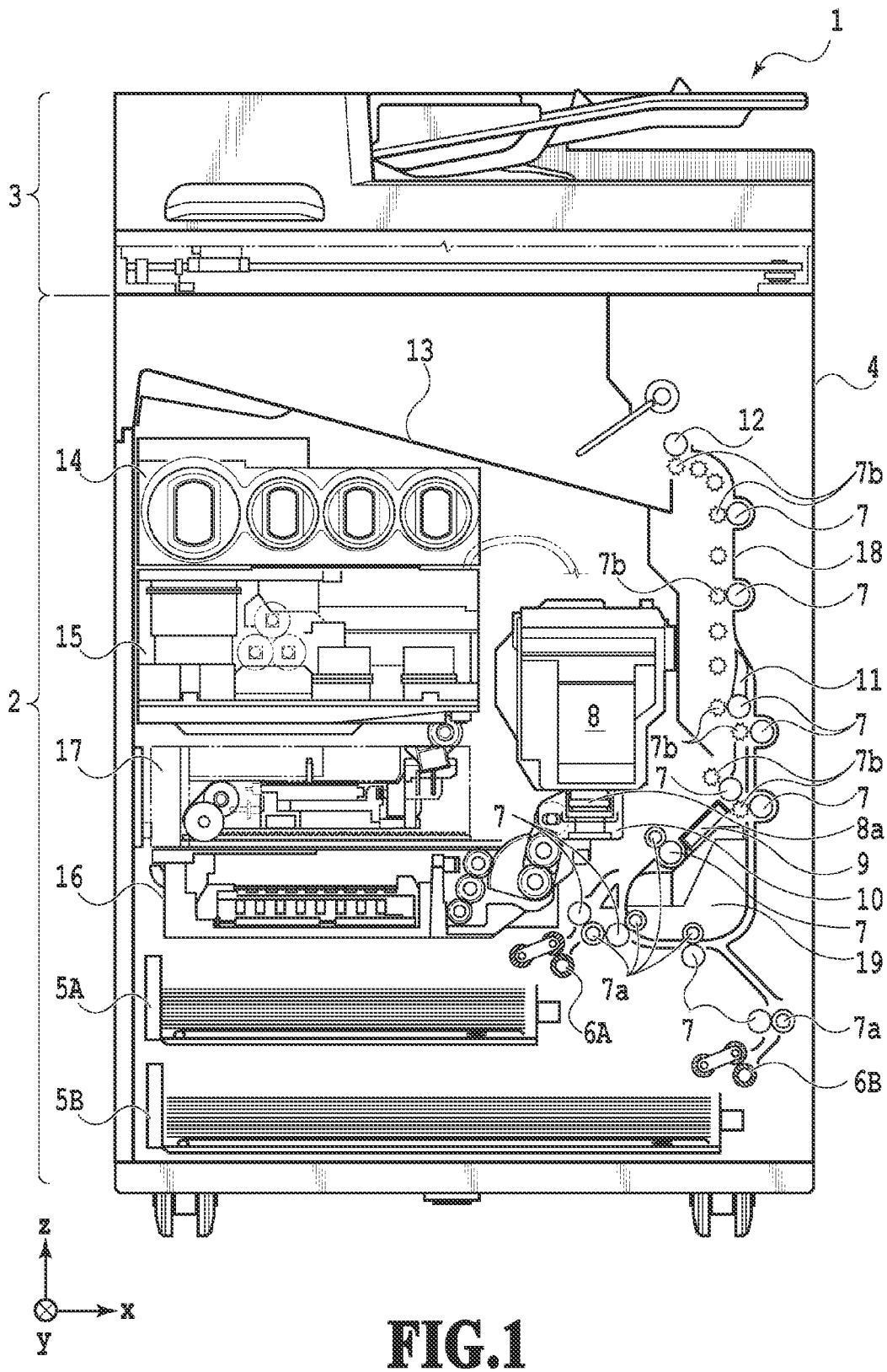
FIG. 1 is an internal configuration diagram of an ink-jet printing apparatus.

FIG. 1 is an internal configuration diagram of an ink-jet printing apparatus 1 (hereinafter, printing apparatus 1) usable as an information processing apparatus of the present invention. In FIG. 1, an x direction is a horizontal direction, a y direction (sheet surface perpendicular direction) is a direction in which ejection ports are aligned in a print head 8, and a z direction is a vertical direction.

The printing apparatus 1 is a multi-function peripheral including a print unit 2 and a scanner unit 3 and the print unit 2 and the scanner unit 3 can execute various processes relating to a printing operation and a reading operation individually or in cooperation. The scanner unit 3 includes an automatic document feeder (ADF) and a flatbed scanner (FBS) and can read originals automatically fed by the ADF and read (scan) an original placed on a document table of the FBS by a user. Although the embodiment is the multi-function peripheral including both of the print unit 2 and the scanner unit 3, a mode including no scanner unit 3 may be employed. FIG. 1 illustrates a standby state where the printing apparatus 1 is performing neither the printing operation nor the reading operation.

A first cassette 5A and a second cassette 5B that contain print media (cut sheets) S are detachably installed in a bottom portion of the print unit 2 on the lower side in the vertical direction. Relatively small print media up to a size of A4 are contained in the first cassette 5A while being stacked one on top of another and relatively large print media up to a size of A3 Are contained in the second cassette 5B while being stacked one on top of another. A first feeding unit 6A that separates the contained print media S from one another and feeds the print media S one by one is provided near the first cassette 5A. Similarly, a second feeding unit 6B is provided near the second cassette 5B. In a case where the printing operation is performed, the print media S are selectively fed from one of the cassettes.

Conveyance rollers 7, a discharge roller 12, pinch rollers 7a, spurs 7b, a guide 18, an inner guide 19, and a flapper 11 are a conveyance mechanism that guides the print media S in a predetermined direction. The conveyance rollers 7 are arranged upstream and downstream of the print head 8 and are drive rollers driven by a not-illustrated conveyance motor. The discharge roller 12 is arranged just before a discharging port and is a drive roller driven by the not-illustrated conveyance motor. The pinch rollers 7a are driven rollers that rotate by nipping the print media S before the printing together with the conveyance rollers 7. The spurs 7b rotate by nipping the print media S subjected to the printing together with the conveyance rollers 7 or the discharge roller 12.

The guide 18 is provided in a conveyance path of the print media S and guides the print media S in the predetermined direction. The inner guide 19 has a curved side surface that is a member extending in the y direction, and guides the print media S along this side surface. The flapper 11 is a member that switches the direction in which the print media S are conveyed in a duplex printing operation. A discharge tray 13 is a tray for stacking and holding the print media S for which the printing operation is completed and which are discharged by the discharge roller 12.

The print head 8 of the embodiment is a full-line type color ink-jet print head and multiple ejection ports that eject inks according to print data are aligned in the y direction in FIG. 1, corresponding to the width of the print media S. In a case where the print head 8 is at a standby position, an ejection port surface 8a of the print head 8 is capped by a cap unit 10 as illustrated in FIG. 1. In the printing operation, a print controller 202 to be described later changes the orientation of the print head 8 such that the ejection port surface 8a faces a platen 9. The platen 9 is formed of a flat plate extending in the y direction and supports the print medium S subjected to the printing operation by the print head 8, from the back side.

An ink tank unit 14 stores inks of four colors to be supplied to the print head 8. An ink supply unit 15 is provided in the middle of channels connecting the ink tank unit 14 and the print head 8 and adjusts the pressure and flow rate of each ink in the print head 8 to appropriate ranges. In the embodiment, a circulation ink supply system is employed and the ink supply unit 15 adjusts the pressure of each ink supplied to the print head 8 and the flow rate of the ink collected from the print head 8 to the appropriate ranges.

A maintenance unit 16 includes the cap unit 10 and a wiping unit 17 and activates these units at predetermined timing to perform a maintenance operation on the print head 8. The maintenance operation is described in detail later.

Figure 2:
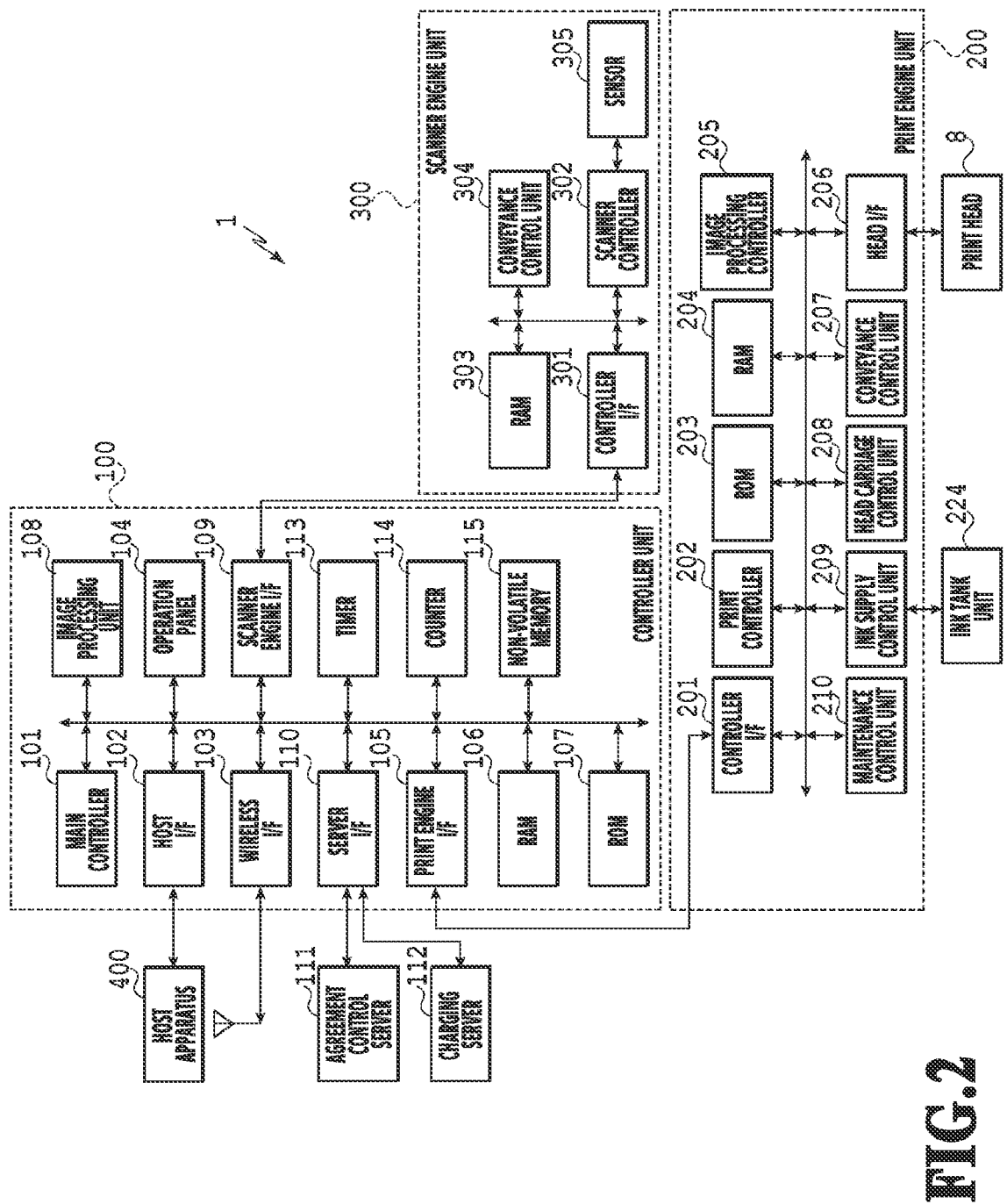
FIG. 2 is a block diagram illustrating a control configuration of the printing apparatus.

FIG. 2 is a block diagram illustrating a control configuration in the printing apparatus 1. The control configuration is formed of a print engine unit 200 that mainly controls the entire print unit 2, a scanner engine unit 300 that controls the entire scanner unit 3, and a controller unit 100 that controls the entire printing apparatus 1. The print controller 202 controls various mechanisms of the print engine unit 200 according to instructions of a main controller 101 in the controller unit 100. The main controller 101 in the controller unit 100 controls various mechanisms of the scanner engine unit 300. Details of the control configuration are described below.

In the controller unit 100, the main controller 101 formed of a central processing unit (CPU) controls the entire printing apparatus 1 according to a program and various parameters stored in a read only memory (ROM) 107 while using a random access memory (RAM) 106 as a work area. For example, in a case where the main controller 101 receives a print job from a host apparatus 400 via a host interface (I/F) 102 or a wireless I/F 103, an image processing unit 108 performs predetermined image processing on the received image data according to an instruction of the main controller 101. Then, the main controller 101 sends the image data subjected to the image processing to the print engine unit 200 via a print engine I/F 105. Moreover, for example, in a case where the main controller 101 receives a read command from the host apparatus 400, the main controller 101 sends this command to the scanner unit 3 via a scanner engine I/F 109.

Note that the printing apparatus 1 may obtain the image data from the host apparatus 400 through wireless communication or wired communication or obtain the image data from an external storage apparatus (USB memory or the like) connected to the printing apparatus 1. Communication methods used in the wireless communication and the wired communication are not limited to certain methods. For example, Wireless Fidelity (Wi-Fi) (registered trademark) and Bluetooth (registered trademark) can be applied as the communication method used in the wireless communication. Moreover. Universal Serial Bus (USB) and the like can be applied as the communication method used in the wired communication.

A server I/F 110 is an interface used to connect the printing apparatus 1 to the Internet. The main controller 101 exchanges information with an agreement control server 111 and a charging server 112 via the server I/F 110.

An operation panel 104 is a mechanism used by the user to perform input and output on the printing apparatus 1. The user can instruct the printing apparatus 1 to perform operations such as copying and scanning, set a print mode, set and update agreement information of the printing apparatus 1 through the operation panel 104.

A timer 113 manages current time. A counter 114 counts the number of images printed by the printing apparatus 1 in each of a color mode and a monochrome mode. Count values obtained by the counter 114, state information of the printing apparatus to be described later, and the like are saved as necessary in a non-volatile memory 115.

In the print engine unit 200, the print controller 202 formed of a CPU controls various mechanisms included in the print unit 2 according to a program and various parameters stored in a ROM 203, under an instruction of the main controller 101. In this case, the print controller 202 uses a RAM 204 as a work area.

For example, in a case where the print controller 202 receives various commands and image data via a controller I/F 201, the print controller 202 saves the various commands and the image data temporarily in the RAM 204. The print controller 202 causes an image processing controller 205 to convert the saved image data to print data and this enables the image data to be used by the print head 8 in the printing operation.

After the generation of the print data, the print controller 202 causes the print head 8 to execute the printing operation based on the print data via a head I/F 206. In this case, the print controller 202 drives the feeding units 6A, 6B, the conveyance rollers 7, the discharge roller 12, and the flapper 11 illustrated in FIG. 1 via a conveyance control unit 207 to convey the print media S. The printing operation by the print head 8 is executed along with the conveyance operation of the print media S according to an instruction of the print controller 202 and the print processing is performed.

A head carriage control unit 208 changes the orientation and position of the print head 8 depending on an operation state such as a maintenance state and a printing state of the printing apparatus 1. An ink supply control unit 209 controls the ink supply unit 15 such that the pressure of the ink supplied to the print head 8 is within an appropriate range. A maintenance control unit 210 controls operations of the cap unit 10 and the wiping unit 17 in the maintenance unit 16 in a case where the maintenance operation is performed on the print head 8.

In the scanner engine unit 300, the main controller 101 controls a hardware resource of a scanner controller 302 according to the program and the various parameters stored in the ROM 107 while using the RAM 106 as a work area. The various mechanisms included in the scanner unit 3 are thereby controlled. For example, the main controller 101 controls the hardware resources in the scanner controller 302 to convey the originals mounted on the ADF by the user through a conveyance control unit 304 and read the originals with a sensor 305. Then, the scanner controller 302 saves the read image data in a RAM 303. Note that the print controller 202 converts the obtained image data to the print data as described above and this allows the print head 8 to execute the printing operation based on the image data read in the scanner controller 302.

Figure 3:
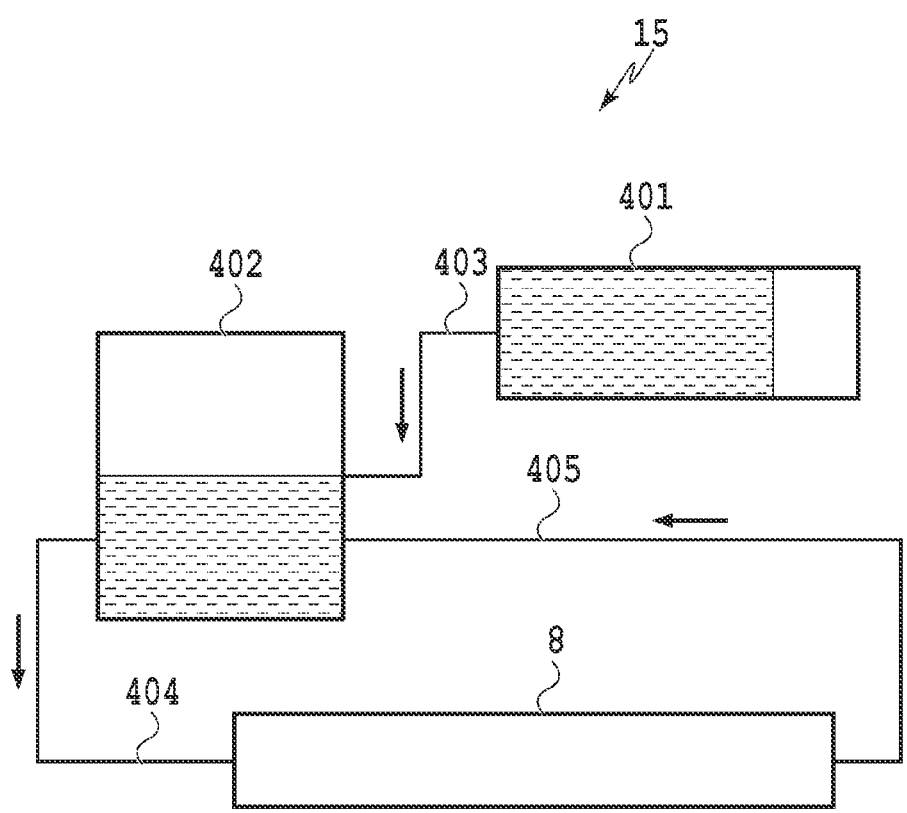
FIG. 3 is a diagram schematically illustrating a configuration of an ink supply unit.

FIG. 3 is a diagram schematically illustrating a configuration of the ink supply unit 15 (see FIG. 1) in the printing apparatus 1. The ink supply unit 15 supplies the ink supplied from a main tank 401 attached to the ink tank unit 14 to the print head 8 while causing the ink to circulate at appropriate pressure. Although the configuration for an ink of one color is illustrated in FIG. 3, the same configuration is provided for each ink color in the printing apparatus 1.

The ink supply unit 15 includes a sub tank 402, a connection channel 403, a supply channel 404, and a collecting channel 405. The sub tank 402 is a tank that temporarily receives the ink to be supplied to the print head 8 and is connected to the print head 8 via the supply channel 404 and the collecting channel 405. The ink circulates from the sub tank 402 to the supply channel 404, to the print head 8, to the collecting channel 405 and returns to the sub tank 402. During the aforementioned circulation, the print head 8 ejects the ink according to the print data.

Performing such ink circulation control allows fresh ink to be stably supplied to the print head 8. As a result, it is possible to stabilize the ejection operation of the print head 8 and maintain quality of an outputted image at a high level.

The amount of received ink in the sub tank 402 gradually decreases with the printing operation. Accordingly, in a case where the amount of received ink in the sub tank 402 reaches or falls below a predetermined value, the print controller 202 (see FIG. 2) drives a not-illustrated pump at predetermined timing and reduces the pressure inside the sub tank 402. The sub tank 402 is thereby replenished with the ink from the main tank 401 connected to the sub tank 402 by the connection channel 403. The main tank 401 whose ink is consumed is removed from the ink tank unit 14 and the user can replace it with a new main tank 401. The print controller 202 performs such sub tank replenishment processing as a preparation stage of the printing apparatus 1 before the reception of the print job, as appropriate.

In the embodiment, the main controller 101 controls the aforementioned ink circulation and the printing operation by the print head 8 based on a conclusion state of a usage agreement of the printing apparatus 1.

<Outline of Usage Agreement>

The printing apparatus 1 of the embodiment can receive a specific service under a subscription agreement. Contents of the subscription agreement are not limited to particular contents. In the embodiment, the subscription agreement is assumed to be an agreement in which a main tank being a target of service (hereinafter, referred to as service target tank) is available for printing of up to a predetermined number of sheets by paying a monthly flat-rate charge. The service target tank is a main tank allowed to be used only in a case where the subscription agreement is concluded. Moreover, the service target tank is the same type of tank as the general main tank (hereinafter, referred to as general tank) and both tanks can be attached to the ink tank unit 14 of the printing apparatus 1. Note that a tank memory is attached to each of the main tanks and stores information such as information indicating whether the tank is the service target tank or the general tank and information on the color of the contained ink. Accordingly, the main controller 101 can determine whether the attached tank is the general tank or the service target tank by reading the information stored in the tank memory.

Figure 4A:
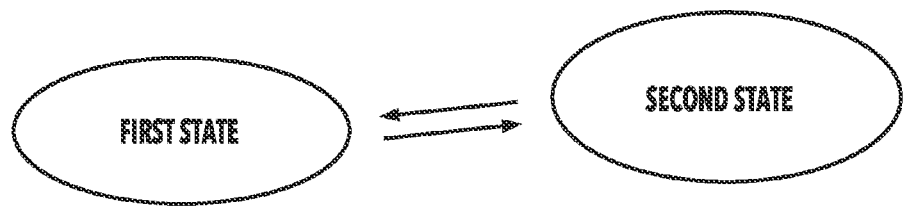
FIGS. 4A and 4B illustrate states of the printing apparatus and a concept view of an information processing system.

FIG. 4A illustrates a state of the printing apparatus 1 based on the subscription agreement. In the embodiment, in a case where the subscription agreement is not concluded, the printing apparatus 1 is assumed to be in a first state in which the service is unavailable. Meanwhile, in a case where the subscription agreement is concluded, the printing apparatus 1 is assumed to be in a second state in which the service is available. At the moment where the printing apparatus 1 is shipped, the printing apparatus 1 is in the first state. Then, if the user concludes the subscription agreement, the state of the printing apparatus 1 is switched from the first state to the second state. The user can switch the printing apparatus 1 between the first state and the second state by concluding or cancelling the subscription agreement. Moreover, in a case where the user has not canceled the subscription agreement but a state in which the printing apparatus 1 cannot communicate with the servers continues for a predetermined period, a service provider cannot manage the usage state of the printing apparatus 1. Accordingly, the printing apparatus 1 of the embodiment is switched from the second state to the first state. The aforementioned state of the printing apparatus 1 is required to be appropriately set to allow the user to receive an appropriate service matching the agreement.

Figure 4B:
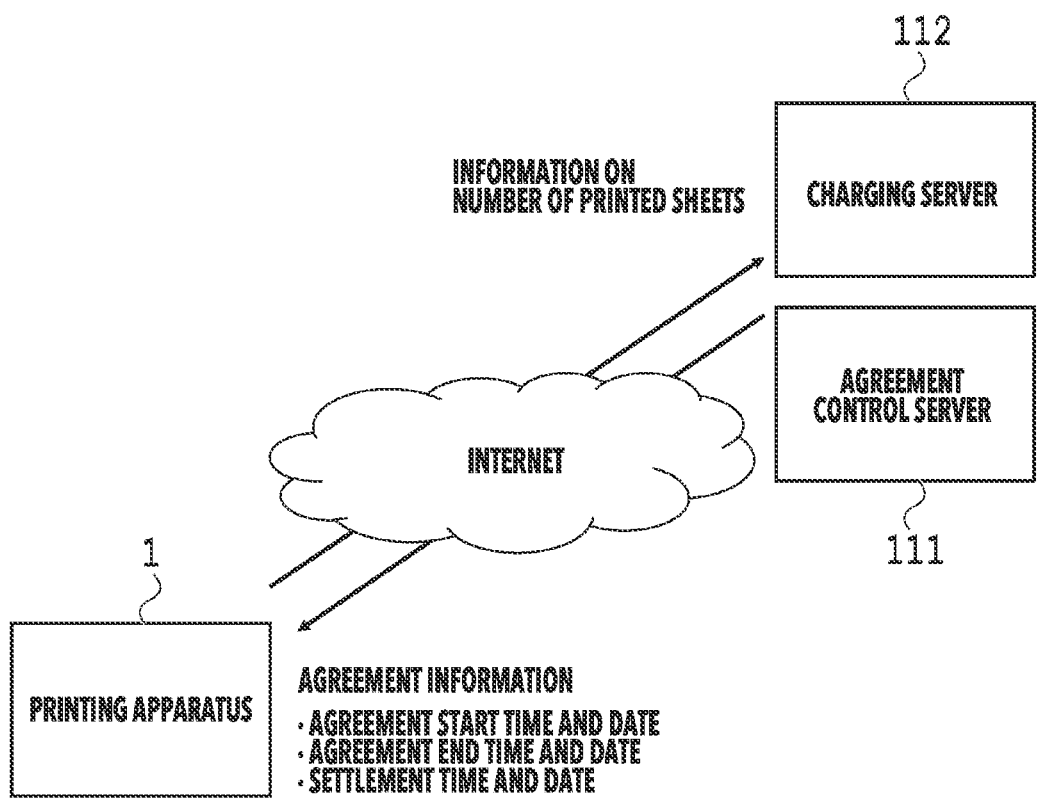

FIG. 4B is a diagram illustrating an information processing system of the embodiment. In the embodiment, the agreement control server 111 and the charging server 112 connected to the printing apparatus 1 via the Internet manage the subscription agreement of the printing apparatus 1. The main controller 101 of the printing apparatus 1 periodically receives agreement information of the printing apparatus 1 from the agreement control server 111 and saves the agreement information in the non-volatile memory 115 (see FIG. 2). The received agreement information includes an agreement start time and date, an agreement end time and date, a monthly settlement time and date, and the like. Moreover, the main controller 101 can obtain a current time and date from the agreement control server 111 as necessary. The format of the current time and date is in compliant with ISO8601 (yyyy-MM-ddTHH:mm:ssZ). Employing the mode in which the current time and date is obtained from the agreement control server 111 allows time to be uniformly managed among all printing apparatuses 1 connected to the server. Although the expressions of "agreement start time and date", "agreement end time and date", and "settlement time and date" are used in the description, in the embodiment, these pieces of information do not have to necessary include information on time. In other words, these pieces of information may include information only on year, month, and date.

Meanwhile, the main controller 101 of the printing apparatus 1 periodically sends information on the number of sheets printed by the printing apparatus 1 and information on a remaining inks mount to the charging server 112. In this case, the information on the number of printed sheets includes the number of sheets printed in the color mode and the number of sheets printed in the monochrome mode in a predetermined period. The charging server 112 compares the number of printed sheets with the contents of agreement and performs charging processing depending on the agreement. For example, in a case where the number of printed sheets is equal to or less than a defined value in a state where the subscription agreement concluded, the charging server 112 charges the monthly flat-rate charge. In a case where the number of printed sheets exceeds the defined value, the charging server 112 charges an excess charge in addition to the flat-rate charge. Moreover, the charging server 112 infers whether delivery of the main tank to be described later is necessary or not based on the received information on the remaining ink amount.

Figure 5:
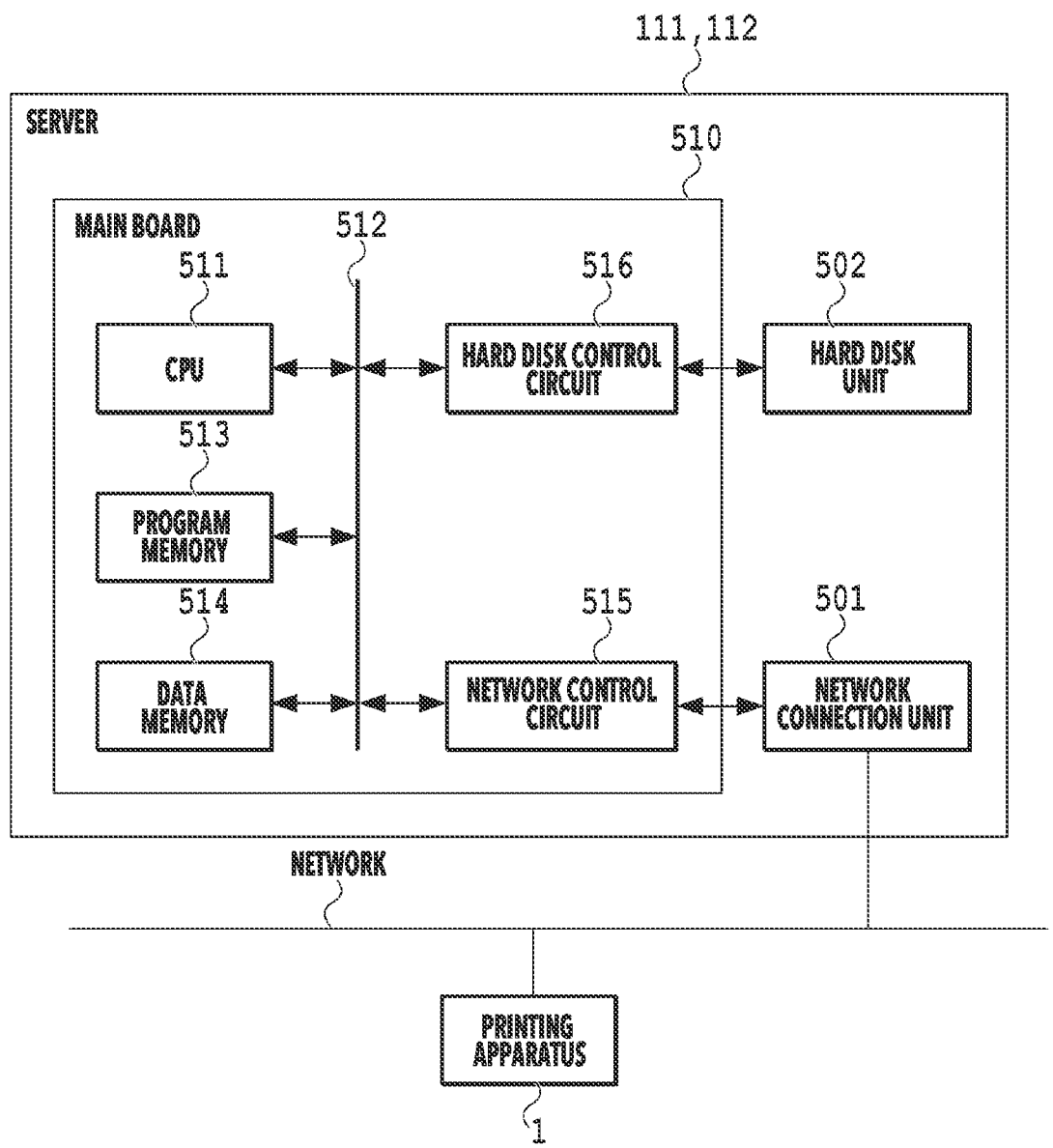
FIG. 5 is a block diagram illustrating a configuration of a server.

FIG. 5 is a block diagram illustrating a configuration of the agreement control server 111 and the charging server 112. In FIG. 5, the same hardware configuration is assumed to be used for the agreement control server 111 and the charging server 112. Hereinafter, the agreement control server 111 and the charging server 112 are simply referred to as servers 111, 112 for the sake of convenience. Each of the servers 111, 112 includes a network connection unit 501, a hard disk unit 502, and a main board 510 that controls the entire apparatus. The main board 510 includes a CPU 511, an internal bus 512, a program memory 513, a data memory 514, a network control circuit 515, and a hard disk control circuit 516. Although the system example in which the agreement control server 111 performs the agreement management and the charging server 112 performs the charging management and the delivery management is described in the example, the embodiment is not limited to this system example. For example, one server may perform functions of managing all of agreement, charging, and delivery. Alternatively, three or more servers may perform the functions of managing agreement, charging, and delivery in cooperation. A configuration including one or more servers is referred to as a server system and, in this embodiment, the server system is assumed to manage agreement, charging, and delivery.

The CPU 511 in a microprocessor form arranged in the main board 510 operates according to contents of the data memory 514 and a control program stored in the program memory 513 connected to the CPU 511 via the internal bus 512. The CPU 511 connects to the Internet by controlling the network connection unit 501 via the network control circuit 515 and communicates with one or more printing apparatuses 1 and other servers. The CPU 511 can read data from and write data to the hard disk unit 502 connected to the CPU 511 via the hard disk control circuit 516. An operating system and control software of the server 111, 112 used by being loaded onto the program memory 513 are stored in the hard disk unit 502 in addition to various pieces of data.

In the case of the agreement control server 111, the agreement start time and date and the agreement end time and date of the printing apparatus 1 and the like are stored in the data memory 514 in a rewritable manner. In a case where the server 111 receives a request for the agreement information from the printing apparatus 1, the CPU 511 sends the printing apparatus 1 the information on the agreement start time and date and the agreement end time and date saved in the data memory 514, via the network connection unit 501. In the case of the charging server 112, the number of sheets printed by the printing apparatus 1 and the like are saved in the data memory 514 in a rewritable manner. In a case where the charging server 112 receives the information on the number of printed sheets from the printing apparatus 1, the CPU 511 saves the information received via the network connection unit 501 in the data memory 514.

Figure 6A:
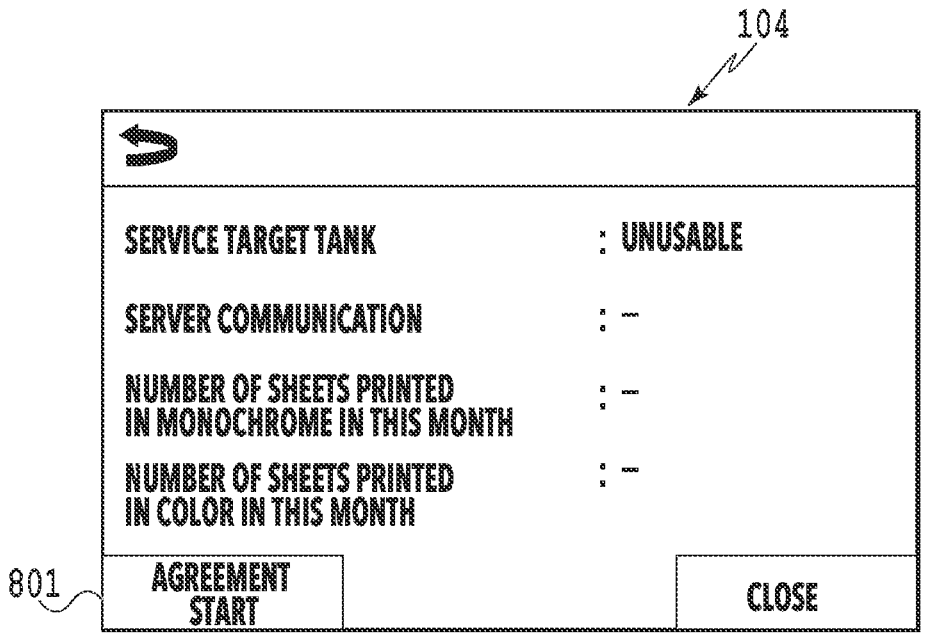
FIGS. 6A and 6B are views illustrating a display screen of an operation panel.
Figure 6B:
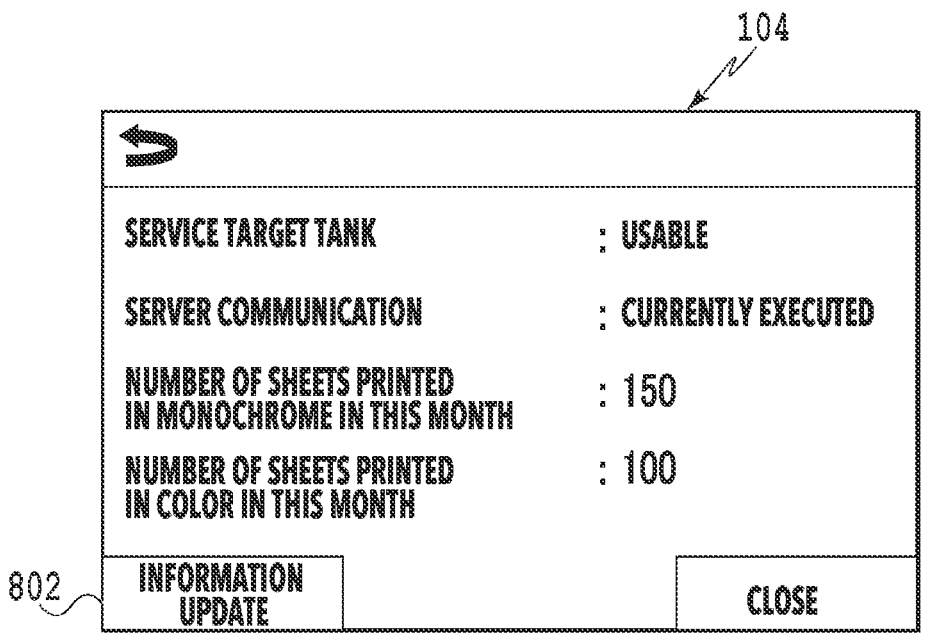

FIGS. 6A and 6B are views illustrating a display screen of the operation panel 104 used by the user to conclude the subscription agreement and check the agreement state in the printing apparatus 1. FIG. 6A illustrates the display screen in a case where the printing apparatus 1 is in the first state and FIG. 6B illustrates the display screen in a case where the printing apparatus 1 is in the second state.

In a case where the printing apparatus 1 is in the first state, that is the subscription agreement is not concluded, as illustrated in FIG. 6A, notices such as a notice indicating that the service target tank cannot be used and a notice indicating that communication with the servers is not performed are displayed on the operation panel 104. In a case where the user presses an agreement start button 801 in a lower left portion of the screen, the printing apparatus 1 starts obtaining the agreement information from the agreement control server 111. Note that, in this case, a separate subscription agreement is assumed to be concluded between the user and the service provider (sales company of the printer) in advance. Moreover, the agreement information (agreement start time and date, agreement end time and date, and the like) is assumed to be stored in the data memory 514 (see FIG. 5) of the agreement control server 111 based on the agreement contents. Thus, the printing apparatus 1 can obtain the agreement information by the pressing of the agreement start button 801. In other words, the agreement start button 801 in this case can be also referred to as a communication start button.

Note that the method of agreement is not limited to the aforementioned method. For example, the subscription agreement may be concluded by an operation on the printing apparatus 1 even if there is no agreement concluded between the user and the service provider in advance. In this case, for example, pressing of the agreement start button 801 by the user causes the display screen to switch to a screen for agreement and the user can conclude the subscription agreement through the operation panel 104. The conclusion information of the subscription agreement is sent to the agreement control server 111 and the agreement control server 111 saves the agreement start time and date, the agreement end time and date, and the like in the data memory 514 (see FIG. 5) according to the received information.

As described above, the agreement control server 111 sends the printing apparatus 1 the agreement start time and date and the agreement end time and date saved in the data memory 514 as necessary. This causes the printing apparatus 1 to switch itself from the first state to the second state.

In a case where the printing apparatus 1 is in the second state, that is the subscription agreement is concluded, a screen illustrated in FIG. 6B is displayed on the operation panel 104. Specifically, there are displayed a notice indicating that the service target tank can be used, a notice indicating that the communication with the servers is performed, the number of sheets printed in the monochrome mode in this month, and the number of sheets printed in the color mode in this month. Pressing of an information update button 802 in a lower left portion of the screen by the user causes the main controller 101 to access the agreement control server 111 to obtain the latest information and update the display contents of the operation panel 104 based on the obtained information.

FIGS. 11A and 11B are diagrams illustrating display contents in the aforementioned display screen. In an item of "service target tank", "usable" or "unusable" is displayed. In an item of "server communication", one of "-", "currently executed", and "error" is displayed. The sign "-" indicates that the server communication is not performed and the "currently executed" indicates that the server communication is currently executed. Moreover, the "error" indicates that the printing apparatus 1 accessed the server but was unable to normally communicate therewith. In the case of "error", an error number associated with contents of the error is displayed. FIG. 11B illustrates examples of association between the error numbers and the error contents.

"Number of sheets printed in monochrome in this month" indicates the number of sheets printed in the monochrome mode from the settlement time and date of the last month to the current moment. "Number of sheets printed in color in this month" indicates the number of sheets printed in the color mode from the settlement time and date of the last month to the current moment. Each of these numbers of printed sheets is calculated based on the value counted by the counter 114 and is saved in the non-volatile memory 115. A method of counting the number of printed sheets is described in detail later.

FIGS. 7A and 7B are diagrams illustrating an example of usage conditions of the main tank. FIG. 7A illustrates a usage condition in which the general tank and the service target tank are usable in the state where the subscription agreement is concluded and only the general tank is usable in the state where the subscription agreement is not concluded. Meanwhile, FIG. 7B illustrates a usage condition in which only the service target tank is usable in the state where the subscription agreement is concluded and only the general tank is usable in the state where the subscription agreement is not concluded. As described above, the main controller 101 of the embodiment determines whether to allow the use of each of the attached main tanks based on whether the printing apparatus 1 is in the first state or the second state and whether the main tank is the general tank or the service target tank. Then, if the main controller 101 determines that the attached main tank is not usable, the main controller 101 adds restrictions to the ink circulation, the printing operation, and the like described in FIG. 3. Although either of the usage condition of FIG. 7A or the usage condition of FIG. 7B can be employed in the embodiment, description is given below of an example in which the usage condition of FIG. 7A is employed.

For example, in a case where the ink amount in the sub tank 402 described in FIG. 4 reaches or falls below the predetermined value, the main controller 101 causes the print controller 202 to replenish the sub tank 402 with the ink from the main tank 401 in a case where the main tank 401 is usable. However, in a case where the main tank 401 is not usable, the main controller 101 does not cause the print controller 202 to replenish the sub tank 402 with the ink from the main tank 401. Moreover, in a case where the printing apparatus 1 receives the print job, the main controller 101 transmits the received print job to the print engine unit 200 in a case where the main tank 401 is usable. However, in a case where the main tank 401 is not usable, the main controller 101 does not send the received print job to the print engine unit 200.

<State Setting Sequence of Printing Apparatus>

The state of the printing apparatus 1 needs to be appropriately set to appropriately provide the service based on the subscription agreement. Accordingly, in the embodiment, in a case where the printing apparatus 1 is in the second state, the main controller 101 periodically accesses the agreement control server 111 and obtains the agreement information (see FIG. 4B).

FIG. 8 is a flowchart for explaining a state setting sequence performed by the main controller 101. The main controller 101 periodically and repeatedly performs this processing according to the program stored in the ROM 107 while using the RAM 106 as the work area in a case where the printing apparatus 1 is in the second state. Moreover, the main controller 101 executes this processing also in a case where a certain operation relating to the subscription agreement is performed on the operation panel 104.

In a case where this processing is started, in S801, the main controller 101 first obtains the agreement information from the agreement control server 111. Specifically, the main controller 101 accesses the agreement control server 111 and obtains the agreement start time and date and the agreement end time and date saved in the agreement control server 111 as well as the current time and date.

In S802, the main controller 101 determines whether the obtaining of the agreement information in S801 has been successful or has failed. In a case where the obtaining has been successful, the main controller 101 proceeds to S803 and clears (deletes) the communication failure time and date saved in the non-volatile memory 115.

In S804, the main controller 101 refers to the agreement start time and date, the agreement end time and date, and the current time and date obtained in S801 and determines whether the current time and date is included in a period between the agreement start time and date and the agreement end time and date. Then, in a case where the current time and date is included in the period, the main controller 101 proceeds to S805 and sets the printing apparatus 1 to the second state. Specifically, the main controller 101 writes information indicating that the printing apparatus 1 is in the second state, in a state information region of the non-volatile memory 115.

In S802, the main controller 101 determines whether the obtaining of the agreement information in S801 has been successful or has failed. In a case where the main controller 101 determines that the obtaining of the agreement information has failed, this processing is terminated. Meanwhile, in a case where the main controller 101 determines that the obtaining of the agreement information has been successful, the main controller 101 proceeds to S803 and compares the current time and date with the agreement start time and date and the agreement end time and date obtained in S801 to determine whether the current time and date is included in the agreement period between the agreement start time and date and the agreement end time and date. Then, in a case where the current time and date is included in the period, the main controller 101 proceeds to S804 and sets the printing apparatus 1 to the second state. Specifically, the main controller 101 writes information indicating that the printing apparatus 1 is in the second state, in a state information region of the non-volatile memory 115.

Meanwhile, in a case where the current time and date is not included in the agreement period between the agreement start time and date and the agreement end time and date, the main controller 101 proceeds to S805 and sets the printing apparatus 1 to the first state. Specifically, the main controller 101 writes information indicating that the printing apparatus 1 is in the first state, in the state information region of the non-volatile memory 115. Then, this processing is terminated.

Figure 8A:
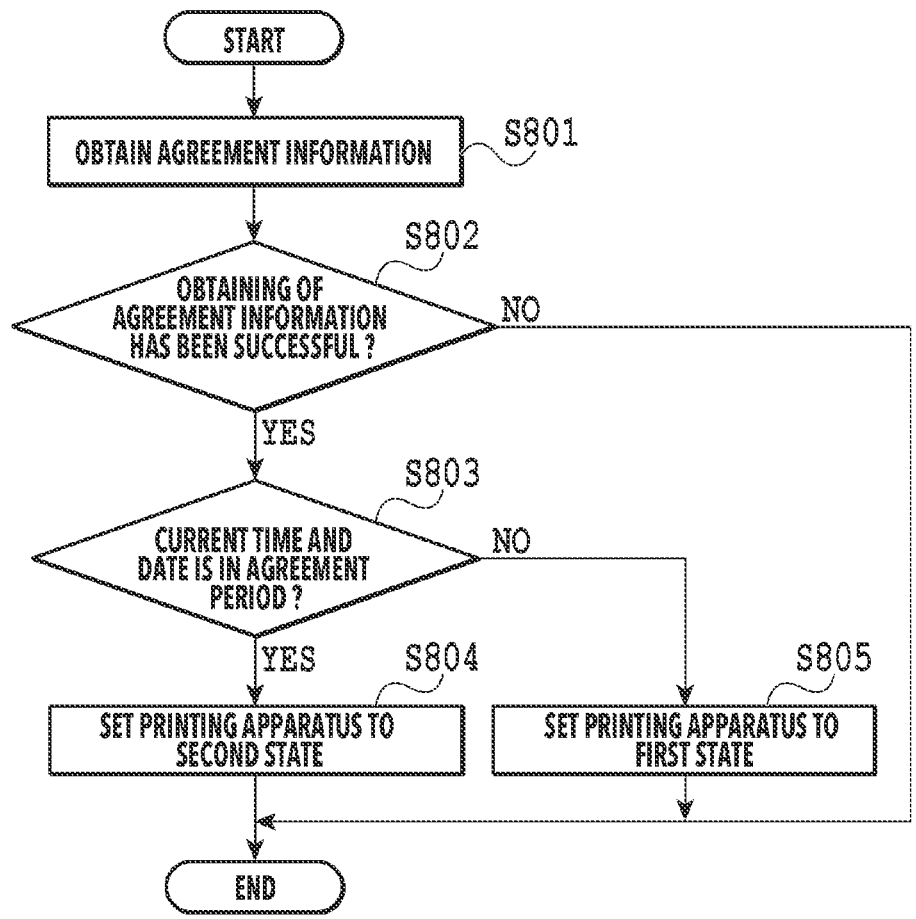
FIGS. 8A and 8B are flowcharts for explaining a state setting sequence.
Figure 8B:
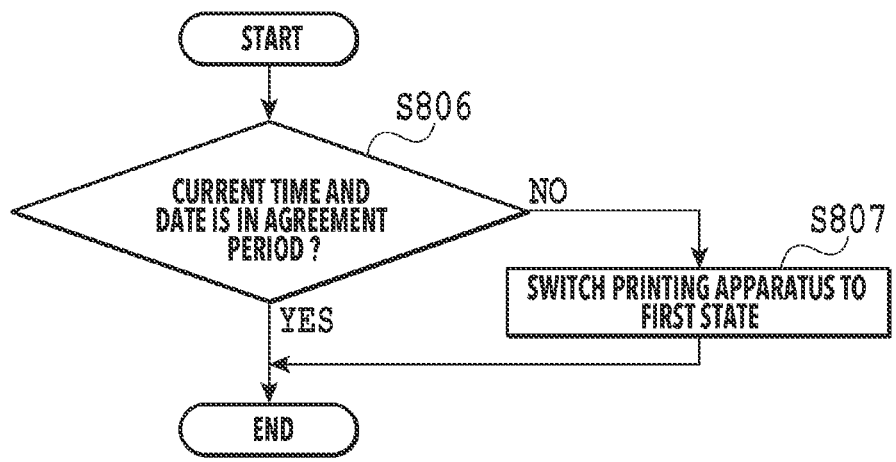

FIG. 8B is a flowchart for explaining a state setting sequence periodically and repeatedly performed inside the printing apparatus 1 in a case where the printing apparatus 1 is in the second state. This processing is performed only by the internal configuration of the printing apparatus 1, separate from the state setting sequence in FIG. 8A performed via the server and is repeatedly performed at a shorter cycle than that of the state setting sequence in FIG. 8A.

In a case where this processing is started, in S806, the main controller 101 determines whether the current time and date managed by the printing apparatus 1 is included in the period between the agreement start time and date and the agreement end time and date currently stored in the non-volatile memory 115. Then, in a case where the current time and date is included in the period between the agreement start time and date and the agreement end time and date, the main controller 101 terminates this processing while maintaining the printing apparatus 1 in the second state.

Meanwhile, in a case where the main controller 101 determines that the current time and date is not included in the period between the agreement start time and date and the agreement end time and date in S806, the main controller 101 proceeds to S807 and switches the printing apparatus 1 from the second state to the first state. Then, this processing is terminated.

As described above, according to the embodiment, it is possible to appropriately set the state of the printing apparatus 1 based on the agreement start time and date, the agreement end time and date, and the current time and date.

<Setting and Management of Agreement Period>

In this embodiment, the user can conclude and update the subscription agreement through the display screen on the operation panel 104 described in FIG. 6. In this case, the user can independently set the agreement start date and the agreement end date. Then, the set agreement start date and agreement end date are sent to the agreement control server 111 and the agreement control server 111 saves received information on the agreement start time and date, the agreement end time and date, and the like in the data memory 514 (see FIG. 5). Note that, in this embodiment, the agreement end date does not have to be necessarily set. In a case where the agreement end date is undecided, use of the following modes are conceivable: a mode in which the information on the agreement end date is not set; and a mode in which a time and date so far in the future that the agreement end date can be assumed to be substantially undecided is set as "temporary agreement end date". In the latter mode, for example, a date and time 100 years later from the current time and date is inputted as the "temporary agreement end date" and the agreement end date is thereby assumed be substantially undecided. Accordingly, in a case where the agreement end date is undecided, in the former mode, information indicating that the agreement end date is undecided is stored in the memory 514 and, in the latter mode, a time and date in far future is stored in the memory 514. Since the setting of the agreement end date, though a formality, is performed in the latter mode, this mode is preferable in terms of security.

Then, the main controller 101 of the printing apparatus 1 periodically receives the agreement start time and date, the agreement end time and date, and the current time and date from the agreement control server 111 and determines whether the printing apparatus 1 is in the first state or the second state.

Figure 9:
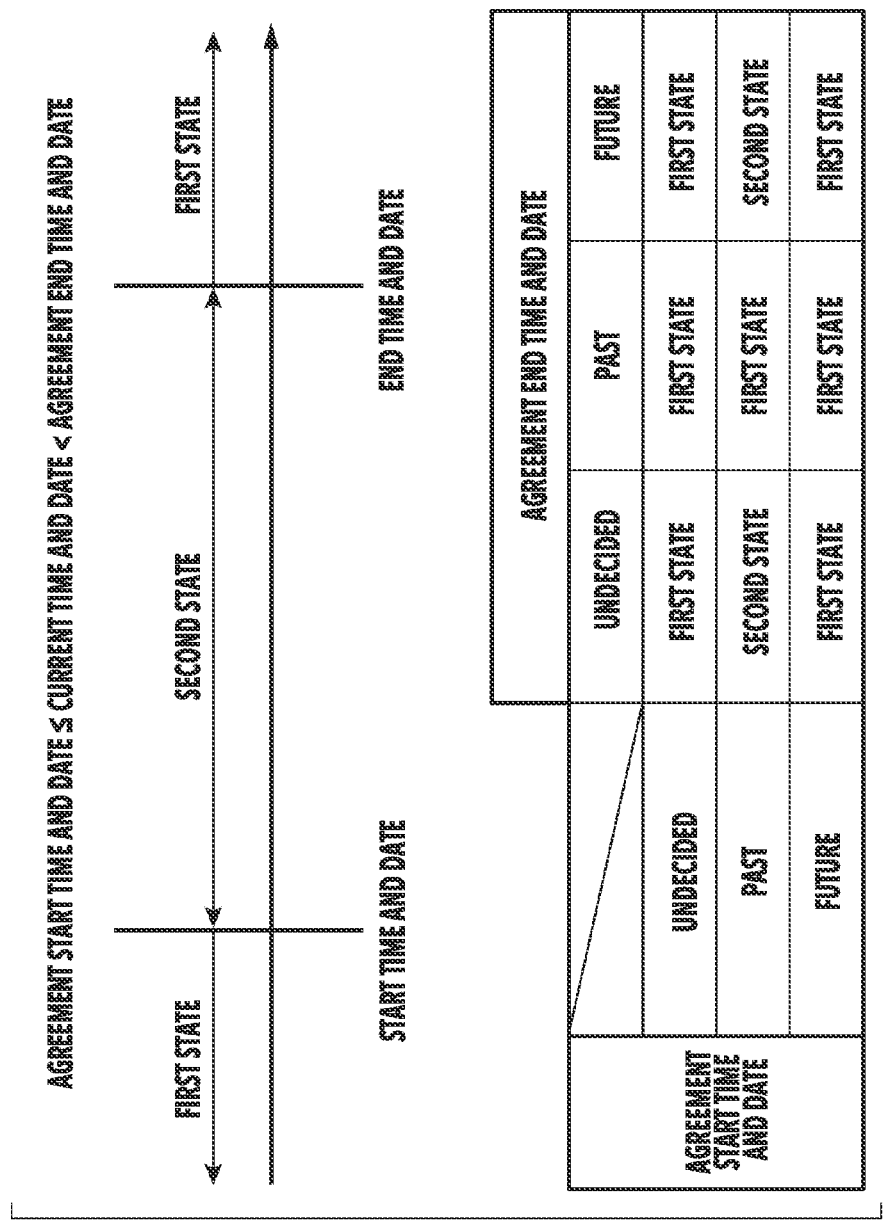
FIG. 9 is a diagram illustrating how the state of the printing apparatus is set.

FIG. 9 is a diagram illustrating how the state of the printing apparatus 1 is set based on the agreement start time and date, the agreement end time and date, and the current time and date. In a case where the current time and date is in the period between the agreement start time and date and the agreement end time and date, the main controller 101 sets the printing apparatus 1 to the second state. Moreover, in a case where the agreement end time and date is undecided and the agreement start time and date is earlier than the current time and date, the main controller 101 sets the printing apparatus 1 to the second state. In cases other than those described above, the main controller 101 sets the printing apparatus 1 to the first state.

Specifically, if the agreement start time and date and the agreement end time and date are both later than the current time and date while the main controller 101 repeatedly performs the two state setting sequences described in FIGS. 8A and 8B, the printing apparatus 1 is set to the first state. Then, if the current time and date exceeds the agreement start time and date, the printing apparatus 1 is set to the second state. Moreover, if the current time and date exceeds the agreement end time and date, the printing apparatus 1 is set to the first state again.

<Settlement Method for Number of Printed Sheets>

Figure 10:
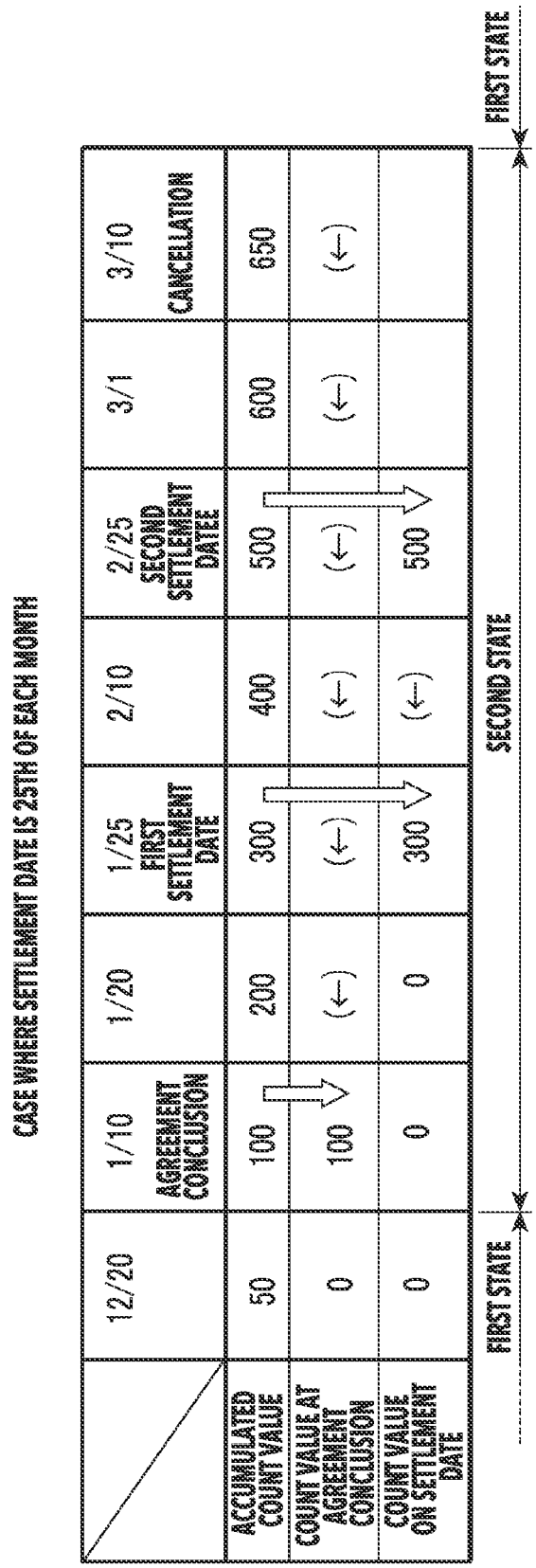
FIG. 10 is a diagram for explaining a settlement method for the number of printed sheets.

FIG. 10 is a diagram for explaining a settlement method for the number of printed sheets. In FIG. 10, a case where the agreement start date is set to January 10th and the agreement end date is set to March 10th is described as an example. Moreover, the settlement date is 25th of each month and the number of sheets printed in a period from 26th of last month to 25th of this month is sent to the charging server 112. Although the number of sheets printed in the color mode and the number of sheets printed in the monochrome mode are generally counted, description is given only for the number of sheets printed in the monochrome mode for the sake of simplification.

In FIG. 10, the accumulated count value indicates the count value of the counter 114 (see FIG. 2) included in the printing apparatus 1. The accumulated count value is zero at the arrival (product purchase) of the printing apparatus 1 and is then incremented by one every time printing of one page is performed in the monochrome mode. Specifically, the accumulated count value indicates the accumulated number of sheets printed in the monochrome mode from the arrival of the printing apparatus 1.

If the current time and date becomes the agreement start date (1/10), the printing apparatus 1 is switched from the first state to the second state. Moreover, at this timing, the main controller 101 reads the accumulated count value of the counter 114 and saves the read value in the non-volatile memory 115 as "count value at agreement conclusion".

If the current time and date becomes the first settlement date (1/25), the main controller 101 reads the accumulated count value of the counter 114 and subtracts the "count value at agreement conclusion" (100) saved in the non-volatile memory 115 from the read accumulated count value (300). Then, the main controller 101 sends the obtained value (300−100=200) to the charging server 112 as the number of sheets printed in this month. Moreover, the main controller saves the accumulated count value (300) at the current moment in the non-volatile memory 115 as "count value on settlement date".

If the current time and date becomes the second settlement date (2/25), the main controller 101 reads the accumulated count value of the counter 114 and subtracts the "count value on settlement date" (300) saved in the non-volatile memory 115 from the read accumulated count value (500). Then, the main controller 101 sends the obtained value (500−300=200) to the charging server 112 as the number of sheets printed in this month. Moreover, the main controller updates the "count value on settlement date" saved in the non-volatile memory 115 to the accumulated count value (500) at the current moment.

If the current time and date becomes the agreement end date (3/10), the printing apparatus 1 is switched from the second state to the first state. Moreover, at this timing, the main controller 101 reads the accumulated count value of the counter 114 and subtracts the "count value on settlement date" (500) saved in the non-volatile memory 115 from the read accumulated count value (650). Then, the main controller 101 sends the obtained value (650−500=150) to the charging server 112 as the number of sheets printed in this month (final month). In this case, the main controller 101 may calculate the total number of sheets printed in the agreement period by subtracting the "count value at agreement conclusion" (100) saved in the non-volatile memory 115 from the accumulated count value (650) of the counter 114.

The charging server 112 performs charging processing based on the number of printed sheets received on each settlement date. Specifically, in a case where the received number of printed sheets is a defined value or less, the charging server 112 charges a flat-rate charge. In a case where the received number of printed sheets exceeds the defined value, the charging server 112 charges an excess charge in addition to the flat-rate charge.

As described above, according to the embodiment, the number of sheets printed in each month can be appropriately managed by using the count value of the counter 114 and the "count value at agreement conclusion" and the "count value on settlement date" saved in the non-volatile memory 115.

As described above, according to the embodiment, the user can set or update the agreement period to any desired period, at any time at or before the time and date at which the agreement is desired to be started. Accordingly, if the server cannot communicate at a timing at which the user intends to set the desired agreement period, the user can set this desired agreement period at another timing. Moreover, the main controller periodically and repeatedly checks the aforementioned agreement period and the current time and date and this allows the printing apparatus to be appropriately set to the first state or the second state from moment to moment. In other words, the user can receive an appropriate service in the desired period.

OTHER EMBODIMENTS

Description is given above of the mode in which the agreement control server 111 and the charging server 112 have independent functions and the printing apparatus 1 communicates with both servers. However, the agreement control server 111 and the charging server 112 may be one server having the functions of both servers. Alternatively, a server system including one or more servers may perform the functions of both servers.

Moreover, description is given above of a case where the ink-jet printing apparatus 1 is used as the information processing apparatus. However, the information processing apparatus may be an image printing apparatus that uses a coloring material other than the ink. For example, in a case where the subscription agreement is concluded with an image printing apparatus that uses toner as the color material being the information processing apparatus, a specific toner cartridge (container containing the toner) may be made usable.

Moreover, the information processing apparatus may be an apparatus other than the printing apparatus as long as the information processing apparatus is capable of commutating with the server saving the predetermined agreement information. In this case, the contents of the service based on the subscription agreement are not limited to particular contents and the information processing apparatus only needs to send the charging server a processing amount of processing unique to the information processing apparatus instead of the print processing in the aforementioned embodiment. Any apparatus can function as the information processing apparatus of the present invention as long as the apparatus is an information processing apparatus capable of communicating with the server saving the predetermined agreement information and is an apparatus capable of providing a certain service depending on the agreement conclusion state.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-061431 filed Mar. 30, 2020, which is hereby incorporated by reference wherein in its entirety.

What is claimed is:

1. A printing apparatus capable of communicating with a server, comprising:
   a receiving unit that receives information on an agreement period of a predetermined agreement from the server;
   a setting unit that sets the printing apparatus to a first state or a second state based on a current time and date and an agreement start date indicated by the information on the agreement period, the first state being a state in which a predetermined service based on the predetermined agreement is unavailable, the second state being a state in which the predetermined service is available, wherein the predetermined service is a service that allows use of a specific container containing a coloring material used for printing; and
   a display unit that displays, in a case where the printing apparatus is set to the first state based on the current time and date and the agreement start date indicated by the information received from the server, a first message that indicates that the specific container is unusable, and displays, in a case where the printing apparatus is set to the second state based on the current time and date and the agreement start date indicated by the information received from the server, a second message that indicates that the specific container is usable,
   wherein the printing apparatus performs printing by using the specific container in a case where the specific container is attached to the printing apparatus and the printing apparatus is set to the second state by the setting unit.

2. The printing apparatus according to claim 1, wherein the information on the agreement period includes information on an agreement end date of the predetermined agreement, and
   the setting unit sets the printing apparatus to the first state in a case where the current time and date is not included in a period between the agreement start date and the agreement end date, and sets the printing apparatus to the second state in a case where the current time and date is included in the period.

3. The printing apparatus according to claim 2, wherein, in a case where the agreement period is undecided, the information on the agreement period includes a temporary agreement end date that is a date later than the current time and date, as the agreement end date.

4. The printing apparatus according to claim 1, wherein, in a case where the receiving unit is unable to receive the information on the agreement period from the server, the setting unit sets the printing apparatus to the first state.

5. The printing apparatus according to claim 1 wherein the information on the agreement period further includes information on a settlement date of the predetermined agreement,
   the printing apparatus further comprising:
   a count unit that counts a processing amount of the printing apparatus; and
   a sending unit that sends the server information on the processing amount of the printing apparatus counted by the count unit, on each settlement date.

6. The printing apparatus according to claim 1, wherein the receiving unit receives the current time and date from the server.

7. The printing apparatus according to claim 1, wherein the printing apparatus is an ink-jet printing apparatus including a print head that ejects an ink according to image data, a sub tank that is used to circulate the ink between the sub tank and the print head, and a main tank that contains the ink to be supplied to the sub tank and that is detachably attached to the printing apparatus, and the predetermined service is a service that allows use of the specific main tank.

8. The printing apparatus according to claim 1, further comprising a display unit that displays contents of the predetermined agreement and a state of communication with the server.

9. The printing apparatus according to claim 1, wherein the server is connected to the printing apparatus via the Internet.

10. The printing apparatus according to claim 1, wherein the information on the agreement period of the predetermined agreement is received from the server periodically and repeatedly.

11. The printing apparatus according to claim 1, wherein the information on the agreement period of the predetermined agreement is received from the server upon pressing an item displayed in a screen which displays the first message or the second message.

12. The printing apparatus according to claim 1, wherein the information on the agreement period of the predetermined agreement is input by a user through a screen for agreement which is displayed upon pressing an item displayed in a screen which displays the first message or the second message.

13. The printing apparatus according to claim 12, wherein the information on the agreement period of the predetermined agreement, which is input through the screen for agreement, is sent to the server.

14. A control method of a printing apparatus capable of communicating with a server, comprising:
   receiving information on an agreement period of a predetermined agreement from the server;
   setting the printing apparatus to a first state or a second state based on a current time and date and an agreement start date indicated by the information on the agreement period, the first state being a state in which a predetermined service based on the predetermined agreement is unavailable, the second state being a state in which the predetermined service is available, wherein the predetermined service is a service that allows use of a specific container containing a coloring material used for printing; and
   displacing on a display unit of the printing apparatus, in a case where the printing apparatus is set to the first state based on the current time and date and the agreement start date indicated by the information received from the server, a first message that indicates that the specific container is unusable, and displays, in a case where the printing apparatus is set to the second state based on the current time and date and the agreement start date indicated by the information received from the server, a second message that indicates that the specific container is usable, wherein the printing apparatus performs printing by using the specific container in a case where the specific container is attached to the printing apparatus and the printing apparatus set to the second state.

15. An information processing system including a server and a printing apparatus capable of communicating with the server, the printing apparatus comprising:

a receiving unit that receives information on an agreement period of a predetermined agreement from the server;

a setting unit that sets the printing apparatus to a first state or a second state based on a current time and date and an agreement start date indicated by the information on the agreement period, the first state being a state in which a predetermined service based on the predetermined agreement is unavailable, the second state being a state in which the predetermined service is available, wherein the predetermined service is a service that allows use of a specific container containing a coloring material used for printing; and a display unit that displays, in a case where the printing apparatus is set to the first state based on the current time and date and the agreement start date indicated by the information received from the server, a first message that indicates that the specific container is unusable, and displays, in a case where the printing apparatus is set to the second state based on the current time and date and the agreement start date indicated by the information received from the server, a second message that indicates that the specific container is usable, wherein the printing apparatus performs printing by using the specific container in a case where the specific container is attached to the printing apparatus and the printing apparatus is set to the second state by the setting unit.

* * * * *